United States Patent
Toyama et al.

(10) Patent No.: US 10,005,257 B2
(45) Date of Patent: Jun. 26, 2018

(54) METHOD FOR PRODUCING PRESSURE-SENSITIVE ADHESIVE LAYER-CARRYING OPTICAL FILM

(71) Applicant: NITTO DENKO CORPORATION, Ibaraki-shi, Osaka (JP)

(72) Inventors: Yuusuke Toyama, Ibaraki (JP); Masakuni Fujita, Ibaraki (JP); Atsushi Yasui, Ibaraki (JP); Tomoyuki Kimura, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 181 days.

(21) Appl. No.: 13/912,357

(22) Filed: Jun. 7, 2013

(65) Prior Publication Data
US 2013/0330545 A1    Dec. 12, 2013

(30) Foreign Application Priority Data

Jun. 8, 2012  (JP) ................... 2012-131025

(51) Int. Cl.
| | |
|---|---|
| C09J 7/50 | (2018.01) |
| B32B 7/12 | (2006.01) |
| G02B 1/10 | (2015.01) |
| C09J 5/02 | (2006.01) |
| G02B 5/30 | (2006.01) |

(52) U.S. Cl.
CPC ............. *B32B 7/12* (2013.01); *C09J 5/02* (2013.01); *C09J 7/50* (2018.01); *G02B 1/10* (2013.01); *G02B 5/3033* (2013.01); *C09J 2201/606* (2013.01); *C09J 2203/318* (2013.01); *C09J 2429/006* (2013.01); *C09J 2433/00* (2013.01); *C09J 2471/003* (2013.01); *Y10T 428/2843* (2015.01)

(58) Field of Classification Search
CPC .................................. C09J 7/50; G02B 1/10
USPC .................................................. 427/162–169
See application file for complete search history.

(56) References Cited

U.S. PATENT DOCUMENTS

| | | | |
|---|---|---|---|
| 2005/0073633 A1* | 4/2005 | Satake | G02B 5/305 349/113 |
| 2006/0121273 A1 | 6/2006 | Toyama et al. | |
| 2006/0188712 A1 | 8/2006 | Okada | |
| 2009/0123718 A1* | 5/2009 | Ogasawara | C09J 7/0217 428/215 |
| 2010/0304135 A1 | 12/2010 | Okada et al. | |
| 2011/0001720 A1* | 1/2011 | Asai | C08G 61/126 345/174 |
| 2012/0057230 A1 | 3/2012 | Murakami et al. | |
| 2013/0171371 A1 | 7/2013 | Toyama et al. | |
| 2013/0330545 A1 | 12/2013 | Toyama et al. | |

FOREIGN PATENT DOCUMENTS

| | | |
|---|---|---|
| CN | 101825727 A | 9/2010 |
| JP | 2004-78143 A | 3/2004 |
| JP | 2005-292291 A | 10/2005 |
| JP | 2006-183022 A | 7/2006 |
| JP | 2007-171892 A | 7/2007 |
| JP | 2007-175703 A | 7/2007 |
| JP | 2007-188040 A | 7/2007 |
| JP | 2007-248485 A | 9/2007 |
| JP | 2009-242786 A | 10/2009 |
| JP | 2009-282373 A | 12/2009 |
| JP | 2010-001415 A | 1/2010 |
| JP | 2011-81359 A | 4/2011 |
| JP | 2012-136570 A | 7/2012 |
| JP | 5769667 B2 | 8/2015 |

OTHER PUBLICATIONS

Japanese Office Action dated Nov. 7, 2014, issued in corresponding JP Application No. 2012-131025 with English translation (8 pages).
Decision of Refusal dated Feb. 10, 2015, issued in corresponding Japanese application No. 2012-131025, with English Translation (6 pages).
Decision of Refusal dated Sep. 30, 2016, issued in counterpart Japanese Patent Application No. 2015-092932, with English translation. (2 pages).
Office Action dated Oct. 11, 2016, issued in counerpart Taiwanese Patent Application No. 102119928, with English translation. (12 pages).
Office Action dated Jul. 20, 2016, issued in Chinese Patent Application No. 201310228684.6 with English tranlsation. (14 pages).
Office Action dated Mar. 15, 2016, issued in counterpart Japanese Patent Application No. 2015-092932, with English translation. (7 pages).
Office Action dated Apr. 12, 2017, issued in Chinese Patent Application No. 201310228684.6 with English tranlsation.

(Continued)

*Primary Examiner* — Elizabeth A Burkhart
(74) *Attorney, Agent, or Firm* — Westerman, Hattori, Daniels & Adrian, LLP

(57) ABSTRACT

A method for producing a pressure-sensitive adhesive layer-carrying optical film includes the step of applying, over the optical film, a coating liquid for anchor layer comprising a mixed solvent comprising 10 to 100% by weight of water and 90 to 0% by weight of an alcohol, and a polyoxyalkylene-group-containing polymer so as to give an applied-coat thickness before drying of 20 μm or less; and next drying the workpiece under drying conditions satisfying both of the following requirements (1) and (2):

(1) the drying temperature T is from 40 to 70° C., and
(2) a value obtained by multiplying the drying temperature T (° C.) by the drying period H (seconds), T×H, satisfies:

$$400 \leq (T \times H) \leq 4000,$$

thereby removing the mixed solvent to form the anchor layer.

7 Claims, No Drawings

(56) References Cited

OTHER PUBLICATIONS

Decision of Refusal dated Jul. 19, 2017, issued in Taiwanese Patent Application No. 102119928 with translation.
Office Action dated Oct. 9, 2017, issued in Chinese Patent Application No. 201310228684.6 with English tranlsation.

* cited by examiner

METHOD FOR PRODUCING PRESSURE-SENSITIVE ADHESIVE LAYER-CARRYING OPTICAL FILM

BACKGROUND OF THE INVENTION

Field of the Invention

The present invention relates to a method for producing a pressure-sensitive adhesive layer-carrying optical film having an anchor layer interposed between the film and a pressure-sensitive adhesive layer. Examples of the optical film include a polarizing film, a retardation plate, an optical compensation film, a brightness enhancement film, a reflection reducing film, any other surface-treating film, and any laminate in which two or more thereof are laminated onto each other.

Description of the Related Art

For example, in a liquid crystal display device, it is indispensable to arrange polarizing elements on both sides of its liquid crystal cell, respectively. Generally, in the liquid crystal display device, an organic EL (electro-luminescent) display device and the like, in light of an image forming manner thereof, a polarizing film is bonded thereto as such a polarizing element. In display panels such as liquid crystal panels and organic EL panels, various optical elements have been used besides a polarizing film to improve the display quality of their displays. A front plate has been used to protect image display devices such as a liquid crystal display device, an organic EL display device, a CRT and a PDP, give a high-class impression thereto, and discriminate a design thereof from other designs. In such image display devices, such as a liquid crystal display device and an organic EL display device, and members used together with the image display devices, such as a front plate, a surface-treating film is used, examples thereof including a retardation plate for preventing coloration, a viewing angle enlargement film for improving the viewing angle of the liquid crystal display, a brightness enhancement film for enhancing contrast on their display, a hard coat film used to give a scratch resistance onto their surface, an antiglare treatment film for preventing a surrounding image from being projected onto the image display devices, and a reflection reducing film such as an antireflective film or a low reflective film. These films are collectively named optical films.

When such an optical film is bonded onto a display panel such as a liquid crystal cell or organic EL panel, or onto a front plate thereof, a pressure-sensitive adhesive is usually used. About bonding between an optical film, and a display panel such as a liquid crystal cell or organic EL panel, a front plate, or an optical film, usually, a pressure-sensitive adhesive is used to cause the individual members to be bonded to adhere closely onto each other to decrease light loss. In such cases, it is general to use a pressure-sensitive adhesive layer-carrying optical film, in which a pressure-sensitive adhesive layer is beforehand laid onto a single side surface of an optical film, since the pressure-sensitive adhesive layer-carrying optical film has an advantage that no drying step is required for bonding and fixing the optical film, and other advantages.

An optical film is easily shrunken or expanded when heated or humidified. Thus, when adhesion between an optical film and an adhesive thereon is low, the optical film and the adhesive layer may be partially separated from each other, or may be peeled from each other. When a liquid crystal panel is used, particularly, for a car navigation system or any other article to be mounted onto an automobile, which requires the panel to have a higher endurance, a large shrinkage stress is applied onto the optical film (of the liquid crystal panel). Thus, the separation or peel is more easily caused. Specifically, although an optical film causes no problem in a reliability test made at about 80° C. for, for example, TVs, the film easily causes an inconvenience such as a separation or peel as described above in a reliability test made at about 95° C. for car navigation systems or any other article to be mounted onto an automobile. In a case where after a pressure-sensitive adhesive-layer-carrying optical film is bonded onto a liquid crystal display, the film is once peeled as needed and then is again bonded (or reworked) thereto, the following inconvenience is caused: when the adhesive force between the optical film and the pressure-sensitive adhesive is low, the pressure-sensitive adhesive unfavorably remains on the surface of the liquid crystal display device so that the rework is not efficiently attained. When pressure-sensitive adhesive layer-carrying optical film is handled in the step using the film such as a step of cutting the film, or carrying the film, an edge region of this film may contact a person or an article around the film. In this case, the pressure-sensitive adhesive may be removed in this region so that the liquid crystal panel easily undergoes an inconvenience such as display failure. In order to overcome such inconveniences, a method is carried out in which an anchor layer is applied onto an optical film and then a pressure-sensitive adhesive is applied thereonto to improve the adhesion between the optical film and the pressure-sensitive adhesive layer.

In the meantime, a pressure-sensitive adhesive layer as described above is required not to cause any inconvenience resulting from the pressure-sensitive adhesive when subjected to an endurance test by heating, humidifying and the like, which is usually made as an environment acceleration test. However, when an anchor layer is interposed between an optical film and a pressure-sensitive adhesive layer, a problem is caused that in an endurance test, a solvent crack is generated on the anchor-layer-formed side surface of the optical film. Even when no solvent crack is generated in a reliability test made at about 80° C. for, for example, TVs, a solvent crack may be remarkably generated, particularly, in a reliability test made at about 95° C. for car navigation systems or any other article to be mounted onto an automobile.

Patent Document 1 describes a pressure-sensitive adhesive layer-carrying optical film in which an anchor layer is interposed between the optical film and the pressure-sensitive adhesive layer, and the anchor layer is obtained by coating/drying a coating liquid for anchor layer containing a mixed solvent of water and an alcohol, and a polyamine compound. However, for this pressure-sensitive adhesive layer-carrying optical film, no investigation is concretely made about the composition of the coating liquid for anchor layer, and conditions for drying the liquid in order to solve the problem that a solvent crack is generated on the anchor-layer-formed side surface of the optical film in an endurance test.

Patent Document 2 describes a pressure-sensitive adhesive layer-carrying optical film in which an anchor layer is interposed between the optical film and the pressure-sensitive adhesive layer, and the anchor layer is obtained by coating/drying a coating liquid for anchor layer containing a mixed solvent of water and an oxazoline group-containing polymer, and specifically discloses an example in which about conditions for drying this coating liquid for anchor layer, the drying temperature and the drying period are set to 40 degrees and 120 seconds, respectively. Furthermore, Patent Document 3 describes a pressure-sensitive adhesive layer-carrying optical film in which an anchor layer is interposed between the optical film and the pressure-sensitive adhesive layer, and the anchor layer is obtained by coating/drying a coating liquid for anchor layer made of an aqueous solution containing a polyurethane resin and a water-soluble polythiophene based electroconductive polymer, and specifically discloses an example in which about conditions for drying this coating liquid for anchor layer, the drying temperature and the drying period are set to 80 degrees and 120 seconds, respectively. However, it has been made evident that under these drying conditions, there remains a room for making a further improvement from the viewpoint of preventing the generation of the above-mentioned solvent crack.

Patent Document 4 describes a pressure-sensitive adhesive layer-carrying optical film in which an anchor layer is interposed between the optical film and the pressure-sensitive adhesive layer, and the anchor layer is obtained by coating/drying a coating liquid for anchor layer containing ammonia and a water-dispersible polymer, and specifically discloses an example in which about conditions for drying this coating liquid for anchor layer, the drying temperature and the drying period are set to 50 degrees and 60 seconds, respectively. However, when the proportion of ammonia present in the anchor layer becomes large, the following is caused: in the case of using, for example, a polarizing film as the optical film in a high temperature and high humidity environment, the polarizing property of the polarizing film is varied, which affects the optical property so that the film may be unable to come to satisfy a high endurance in the high temperature and high humidity environment.

As described above, in the prior art, no attention has been paid to the problem that a solvent crack is generated on an anchor-layer-formed side surface of an optical film. Thus, in order to overcome this problem, a further investigation has been required.

[Patent Document 1] JP-A-2004-078143
[Patent Document 2] JP-A-2007-171892
[Patent Document 3] JP-A-2009-242786
[Patent Document 4] JP-A-2007-248485

SUMMARY OF THE INVENTION

The present invention has been made in light of the above-mentioned actual situation. An object thereof is to provide a method for producing a pressure-sensitive adhesive layer-carrying optical film having a pressure-sensitive adhesive layer laminated over at least one surface thereof, with an anchor layer interposed between the optical film and the pressure-sensitive adhesive layer, in which this pressure-sensitive adhesive layer-carrying optical film produced is good in adhesion and excellent in crack resistance at high temperatures.

In order to solve the above-mentioned problems, the inventors have made eager investigations to find out that in a pressure-sensitive adhesive layer-carrying optical film, an anchor-layer-formed-side surface thereof can be effectively prevented from undergoing a solvent crack by using a mixed solvent having a specific solvent composition and optimizing drying conditions for removing this mixed solvent. The present invention has been made on the basis of the investigations, and has attained the above-mentioned objects with the following structure.

Thus, the method for producing a pressure-sensitive adhesive layer-carrying optical film according to the present invention is a method for producing a pressure-sensitive adhesive layer-carrying optical film wherein the optical film has a pressure-sensitive adhesive layer laminated over at least one surface thereof and an anchor layer is interposed between the optical film and the pressure-sensitive adhesive layer, including the step of applying, over the optical film, a coating liquid for anchor layer comprising a mixed solvent comprising 10 to 100% by weight of water and 90 to 0% by weight of an alcohol, and a polyoxyalkylene-group-containing polymer so as to give an applied-coat thickness before drying of 20 µm or less; and next drying the workpiece under drying conditions satisfying both of the following requirements (1) and (2):

(1) the drying temperature T is from 40 to 70° C., and
(2) a value obtained by multiplying the drying temperature T (° C.) by the drying period H (seconds), T×H, satisfies:

$$400 \leq (T \times H) \leq 4000,$$

thereby removing the mixed solvent to form the anchor layer.

In the method for producing the pressure-sensitive adhesive layer-carrying optical film, the alcohol is preferably isopropyl alcohol and/or ethanol.

In the method for producing the pressure-sensitive adhesive layer-carrying optical film, the period from the time of applying of the coating liquid for anchor layer over the optical film to the time when drying is started is preferably 30 seconds or less.

In the method for producing the pressure-sensitive adhesive layer-carrying optical film, the anchor-layer-formed-side surface of the optical film preferably comprises a norbornene resin or (meth)acrylic resin.

The method for producing the pressure-sensitive adhesive layer-carrying optical film preferably has, before the step of forming the anchor layer, a step of subjecting the anchor-layer-formed-side surface of the optical film to corona treatment or plasma treatment.

A method according to another aspect of the present invention for producing a pressure-sensitive adhesive layer-carrying optical film is a method wherein the adhesive layer-carrying optical film is a pressure-sensitive adhesive layer-carrying polarizing film.

The pressure-sensitive adhesive layer-carrying optical film or the pressure-sensitive adhesive layer-carrying polarizing film according to the present invention is a film produced by any of the producing methods as described above. Further, the image display device according to the present invention is an image display device, using the above-mentioned pressure-sensitive adhesive layer-carrying optical film or pressure-sensitive adhesive layer-carrying polarizing film.

In the method according to the present invention for producing a pressure-sensitive adhesive layer-carrying optical film, using the predetermined coating liquid for anchor layer makes it possible to improve the adhesion between its optical film and its pressure-sensitive adhesive layer and further improve the applied-coat external appearance of the anchor layer. Furthermore, drying the coating liquid for anchor layer under the predetermined drying conditions makes it possible to prevent the generation of a solvent crack in the anchor-layer-formed-side surface of the optical film. In particular, the method according to the present invention for producing a pressure-sensitive adhesive layer-carrying optical film makes it possible to produce, a pressure-sensitive adhesive layer-carrying optical film capable of preventing the generation of a solvent crack even in a reliability test made at about 95° C. for a car navigation system and other articles to be mounted onto an automobile. The wettability of the optical film and the anchor layer is excellent since the coating liquid for anchor layer contains the polyoxyalkylene-group-containing polymer.

DETAILED DESCRIPTION OF THE PREFERRED EMBODIMENTS

The present invention relates to a method for producing a pressure-sensitive adhesive layer-carrying optical film having a pressure-sensitive adhesive layer laminated over at least one surface thereof, with an anchor layer interposed between the optical film and the pressure-sensitive adhesive layer. In the pressure-sensitive adhesive layer-carrying optical film, the pressure-sensitive adhesive layer may be provided over one or both of the surfaces of the optical film.

For formation the pressure-sensitive adhesive layer, an appropriate pressure-sensitive adhesive is usable. The kind thereof is not particularly limited. Examples of the pressure-sensitive adhesive include rubbery pressure-sensitive adhesives, acrylic pressure-sensitive adhesives, silicone pressure-sensitive adhesives, urethane pressure-sensitive adhesives, vinyl alkyl ether pressure-sensitive adhesives, polyvinyl alcohol pressure-sensitive adhesives, polyvinyl pyrrolidone pressure-sensitive adhesives, polyacrylamide pressure-sensitive adhesives, and cellulose pressure-sensitive adhesives.

Of these pressure-sensitive adhesives, preferred is any pressure-sensitive adhesive that is excellent in optical transparency, weather resistance, heat resistance and others, and has an adherable property giving appropriate adhesion, cohesiveness and tackiness. It is preferred to use an acrylic pressure-sensitive adhesive as one showing such a characteristic.

The acrylic pressure-sensitive adhesive contains, as a base polymer, an acrylic polymer having monomer units each made of an alkyl (meth)acrylate as a main skeleton. The wording "alkyl (meth)acrylate" denotes any alkyl acrylate and/or any alkyl methacrylate. In the present invention, the word "(meth)" has a meaning equivalent thereto. Examples of the alkyl (meth) acrylate, which constitutes a main skeleton of the acrylic polymer include those having a linear or branched alkyl group having 1 to 20 carbon atoms. Examples thereof include methyl (meth)acrylate, ethyl (meth)acrylate, propyl (meth)acrylate, butyl (meth)acrylate, 2-ethylhexyl (meth)acrylate, isooctyl (meth)acrylate, isononyl (meth)acrylate, isomyristyl (meth)acrylate, and lauryl (meth)acrylate. These may be used alone or in combination. The average number of the carbon atoms of these alkyl groups is preferably from 3 to 9.

One or more copolymerizable monomers may be introduced into the acrylic polymer by copolymerization in order to improve the polymer in tackiness and heat resistance. Specific examples of the copolymerizable monomer include hydroxyl-group-containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl(meth)acrylate, and (4-hydroxymethylcyclohexyl)-methyl acrylate; carboxyl-group-containing monomers such as (meth)acrylic acid, carboxyethyl (meth)acrylate, carboxypentyl (meth)acrylate, itaconic acid, maleic acid, fumaric acid, and crotonic acid; acid-anhydride-group-containing monomers such as maleic anhydride, and itaconic anhydride; a caprolactone adduct of acrylic acid; sulfonic-acid-group-containing monomers such as styrenesulfonic acid, allylsulfonic acid, 2-(meth)acrylamide-2-methylpropanesulfonic acid, (meth)acrylamide propanesulfonic acid, sulfopropyl (meth)acrylate, and (meth)acryloyloxynaphthalenesulfonic acid; and phosphoric-acid-group-containing monomers such as 2-hydroxyethylacryloyl phosphate.

Other examples of the monomer, for modifying the acrylic polymer, include (N-substituted) amide monomers such as (meth) acrylamide, N,N-dimethyl(meth)acrylamide, N-butyl(meth)acrylamide, N-methylol(meth)acrylamide, and N-methylolpropane(meth)acrylamide; alkylaminoalkyl (meth)acrylate monomers such as aminoethyl (meth)acrylate, N,N-dimethylaminoethyl (meth)acrylate, and t-butylaminoethyl (meth)acrylate; alkoxyalkyl (meth)acrylate monomers such as methoxyethyl (meth)acrylate, and ethoxyethyl (meth)acrylate; succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, and N-acryloylmorpholine; maleimide monomers such as N-cyclohexylmaleimide, N-isopropylmaleimide, N-laurylmaleimide, and N-phenylmaleimide; and itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide.

Additional examples of the monomer for modification include vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate monomers such as acrylonitrile, and methacrylonitrile; epoxy-group-containing acrylic monomers such as glycidyl (meth)acrylate; glycol acrylate monomers such as polyethylene glycol (meth)acrylate, polypropylene glycol (meth)acrylate, methoxyethylene glycol (meth)acrylate, and methoxypolypropylene glycol (meth)acrylate; acrylate monomers such as tetrahydrofurfuryl (meth)acrylate, fluorine (meth)acrylate, silicone (meth)acrylate, and 2-methoxyethyl acrylate.

The main component of the acrylic polymer is an alkyl (meth)acrylate in light of the ratio by weight between the entire constituent monomers thereof. The proportion of the copolymerizable monomer in the acrylic polymer is not particularly limited, and is preferably from about 0 to 20%, more preferably from about 0.1 to 15%, even more preferably from about 0.1 to 10% by weight of the entire constituent monomers.

Of these copolymerizable monomers, a hydroxyl-group-containing monomer or a carboxyl-group-containing monomer is preferably used from the viewpoint of the tackiness and the endurance. The monomer becomes a point for reaction with a crosslinking agent. The hydroxyl-group-containing monomer or the carboxyl-group-containing monomer is rich in reactivity with an intermolecular crosslinking agent; thus, these monomers are preferably used for improving the cohesiveness and the heat resistance of the resultant pressure-sensitive adhesive layer.

When the acrylic polymer contains a hydroxyl-group-containing monomer and a carboxyl-group-containing monomer as copolymerizable monomers, these copolymerizable monomers are used in the above-mentioned copolymerizable monomer proportions. The carboxyl-group-containing monomer is contained preferably in a proportion of 0.1 to 10% by weight. The hydroxyl-group-containing monomer is contained preferably in a proportion of 0.01 to 2% by weight. The proportion of the carboxyl-group-containing monomer is more preferably from 0.2 to 8% by weight, even more preferably from 0.6 to 6% by weight. That of the hydroxyl-group-containing monomer is more preferably from 0.03 to 1.5% by weight, even more preferably from 0.05 to 1% by weight.

The average molecular weight of the acrylic polymer is not particularly limited. The weight average molecular weight is preferably from about 300000 to 2500000. The acrylic polymer may be produced by various known methods and an appropriate method may be selected from, for example, radical polymerization methods, such as bulk polymerization, solution polymerization and suspension polymerization methods. A radical polymerization initiator usable therefor may be a known initiator that may be of various types such as azo and peroxide types. The reaction temperature and the reaction period are usually set into the range of about 50 to 80° C. and that of 1 to 8 hours, respectively. Of the above-mentioned production methods, a solution polymerization method is preferred. As a solvent for the acrylic polymer, for example, ethyl acetate or toluene may be generally used. The solution concentration is usually set into the range of about 20 to 80% by weight.

The above-mentioned pressure-sensitive adhesive is preferably rendered a pressure-sensitive adhesive composition containing a crosslinking agent. A polyfunctional compound blendable into the pressure-sensitive adhesive may be an organic crosslinking agent, or a polyfucnitonal metal chelate. Examples of the organic crosslinking agent include epoxy crosslinking agents, isocyanate crosslinking agents, imine crosslinking agents, and peroxide crosslinking agents. These crosslinking agents may be used alone or in combination of two or more thereof. The organic crosslinking agent is preferably any isocyanate crosslinking agent. The polyfunctional metal chelate is a substance in which a polyvalent metal is bonded to an organic compound via covalent bonding or coordinate bonding. Examples of the polyvalent metal atom include Al, Cr, Zr, Co, Cu, Fe, Ni, V, Zn, In, Ca, Mg, Mn, Y, Ce, Sr, Ba, Mo, La, Sn and Ti. In the organic compound, the atom related to the covalent bonding or coordinate bonding is, for example, an oxygen atom. Examples of the organic compound include alkyl esters, alcohol compounds, carboxylic acid compounds, ether compounds, and ketone compounds.

The blend ratio between the acrylic polymer or any other base polymer and the crosslinking agent is not particularly limited. Usually, the amount of the crosslinking agent (solid content) is preferably from about 0.001 to 20 parts by weight, more preferably from about 0.01 to 15 parts by weight for 100 parts by weight of the base polymer (solid content). The crosslinking agent is preferably any isocyanate crosslinking agent as described above. The amount of the isocyanate crosslinking agent is preferably from about 0.001 to 2 parts by weight, more preferably from about 0.01 to 1.5 parts by weight for 100 parts by weight of the base polymer (solid content).

Furthermore, if necessary, the pressure-sensitive adhesive may appropriately contain various additives, such as a thickener, a plasticizer, a glass fiber, glass beads, a metal powder, a filler made of any other inorganic powder, a pigment, a colorant, a filler, an antioxidant, an ultraviolet absorber, and a silane coupling agent, as far as the achievement of the object of the present invention is not hindered. The pressure-sensitive adhesive may be rendered a pressure-sensitive adhesive layer containing fine particles to show light diffusivity.

As the silane coupling agent, any silane coupling agent known in the prior art is usable without especial limitation. Examples thereof include epoxy-group-containing silane coupling agents such as γ-glycidoxypropyltrimethoxysilane, γ-glycidoxypropyltriethoxysilane, γ-glycidoxypropylmethyldiethoxysilane, and 2-(3,4-epoxycyclohexyl)ethyltrimethoxysilane; amino-group-containing silane coupling agents such as 3-aminopropyltrimethoxysilane, N-2-(aminoethyl)-3-aminopropylmethyldimethoxysilane, and 3-triethoxysilyl-N-(1,3-dimethylbutylidene)propylamine; (meth)acryl-group-containing silane coupling agents such as 3-acryloxypropyltrimethoxysilane, and 3-methacryloxypropyltriethoxysilane; and isocyanate-group-containing silane coupling agents such as 3-isocyanatopropyltriethoxysilane. However, when the pressure-sensitive adhesive layer contains the silane coupling agent, the generation of a solvent crack may be promoted in the anchor-layer-formed side surface of the optical film. Thus, the content of the silane coupling agent (solid content) in the base polymer (solid content) is preferably made as small as possible. Specifically, the content is preferably from about 0 to 3 parts by weight, more preferably from about 0 to 2 parts by weight, even more preferably from about 0 to 1 part by weight for 100 parts by weight of the base polymer (solid content).

In the method according to the present invention for producing a pressure-sensitive adhesive layer-carrying optical film, an anchor layer is interposed between a pressure-sensitive adhesive layer and an optical film. This anchor layer is formed by applying, over the optical film, a coating liquid for anchor layer containing a mixed solvent containing 10 to 100% by weight of water and 90 to 0% by weight of an alcohol, and a polyoxyalkylene-group-containing polymer so as to give an applied-coat thickness before drying of 20 μm or less; and next drying the workpiece under drying conditions satisfying both of the following requirements (1) and (2):

(1) the drying temperature T is from 40 to 70° C., and (2) a value obtained by multiplying the drying temperature T (° C.) by the drying period H (seconds), T×H, satisfies:

$$400 \leq (T \times H) \leq 4000,$$

thereby removing the mixed solvent to form the anchor layer.

The mixed solvent in the coating liquid for anchor layer contains a mixed solvent containing 10 to 100% by weight of water and 90 to 0% by weight of an alcohol.

The alcohol is preferably an alcohol hydrophilic at normal temperature (25° C.), in particular, an alcohol miscible with water at an arbitrary ratio. The alcohol is preferably an alcohol having 1 to 6 carbon atoms, more preferably an alcohol having 1 to 4 carbon atoms, even more preferably an alcohol having 1 to 3 carbon atoms. Specific examples of the alcohol include methanol, ethanol, n-propanol, isopropyl alcohol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, and cyclohexanol. Of these examples, ethanol and isopropyl alcohol are preferred, and isopropanol is more preferred. The alcohols may be used alone or in the form of a mixture of two or more thereof. The two or more alcohols may be mixed with each other at an arbitrary ratio. For example, a mixed alcohol may be used which is obtained by mixing ethanol and isopropanol at an arbitrary ratio.

In the case of using, of the above-mentioned mixed solvents, a mixed solvent containing 65 to 100% by weight of water and 0 to 35% by weight of an alcohol (hereinafter referred to also as a "water-rich mixed solvent"), the following advantageous is obtained: in particular, when a polythiophene based polymer, which has electroconductivity, is used as a binder component, the polythiophene based polymer is improved in dispersibility in the coating liquid for anchor layer. As a result, the anchor layer obtained after applying and drying the coating liquid for anchor layer is further improved in electroconductivity. Additionally, when the water-rich mixed solvent is used, a solvent crack in the anchor layer can be more effectively prevented. From the viewpoint of, in particular, the improvement in the electroconductivity of the anchor layer, the mixed solvent used is preferably a mixed solvent containing 80 to 100% by weight of water and 0 to 20% by weight of an alcohol, more preferably a mixed solvent containing 90 to 100% by weight of water and 0 to 20% by weight of an alcohol, in particular preferably a (mixed) solvent containing substantially 100% by weight of water.

The polythiophene based polymer in various forms may be used, but a water-soluble or water dispersible polymer may be suitably used. The weight-average molecular weight of the polythiophene based polymer is preferably 400000 or less, more preferably 300000 or less in terms of that of polystyrene. If the weight-average molecular weight is more than the upper value, the polymer tends not to satisfy the water-solubility or water-dispersibility. When such a polymer is used to prepare a coating liquid, a solid content of the polymer tends to remain in the coating liquid, or the polymer tends to be increased in viscosity so that an anchor layer even in film thickness is not easily formed.

The term "water-soluble" or "water-solubility" denotes that the solubility of any compound in 100 g of water is 5 g or more. The solubility of the polythiophene based polymer in 100 g of water is preferably from 20 to 30 g. A water-dispersible polythiophene based polymer is a polymer in which the polythiophene polymer in the form of fine particles is dispersed in water. A liquid in which this polymer is dispersed in water is small in liquid viscosity to easily attain thin film applying, and further the resultant applied layer is excellent in evenness. The size of the fine particles is preferably 1 μm or less from the viewpoint of the evenness of the anchor layer.

The water-soluble or water-dispersible polythiophene based polymer preferably has, in the molecule thereof, a hydrophilic functional group. Examples of the hydrophilic functional group include sulfonic, amino, amide, imino, quaternary ammonium salt, hydroxyl, mercapto, hydrazino, carboxyl, sulfate, and phosphate groups; and salts of these groups. When the polymer has in the molecule a hydrophilic functional group, the polymer is easily soluble in water, or is easily dispersible, in the form of fine particles, in water. Thus, the water-soluble or water-dispersible polythiophene based polymer can easily be prepared.

Examples of the water-soluble or water-dispersible polythiophene based polymer include DENATRON series polymers manufactured by Nagase ChemteX Corp.

In the coating liquid for anchor layer, an increase in the proportion of a component other than water and the alcohol, for example, ammonia may cause the following: when a polarizing film is used as the optical film in a high-temperature and high-humidity environment, the polarizing property of the polarizing film is varied, which may affect the optical property of the film (and a related device), so that the polarizing film may become unable to satisfy a high endurance in the high-temperature and high-humidity environment. It is therefore preferred that the mixed solvent (solvent for diluting the binder resin) in the coating liquid for anchor layer contains, as main components thereof, water and the alcohol, specifically, the total proportion of water and the alcohol is 90% or more by weight in the mixed solvent. This total proportion is more preferably 95% or more, even more preferably 99% or more, most preferably substantially 100% by weight in the mixed solvent.

When the coating liquid for anchor layer contains ammonia, the applied-coat external appearance of the anchor layer and the optical reliability may be excellent. However, the content of ammonia is preferably as small as possible for the endurance and the prevention of a solvent crack. Specifically, the ammonia content in the coating liquid for anchor layer is preferably less than 0.05 parts by weight, more preferably less than 0.03 parts by weight for 100 parts by weight of the binder resin (solid content).

In the present invention, the coating liquid for anchor layer contains a polyoxyalkylene-group-containing polymer together with the mixed solvent. The polyoxyalkylene-group-containing polymer is, for example, a polyoxyalkylene-group-containing poly(meth)acrylate having a poly(meth)acrylate polymer as a main chain and having a polyoxyalkylene group, such as a polyoxyethylene or polyoxypropylene group, in a side chain. When the wettability of the anchor layer onto an optical film is considered, the content by percentage of the polyoxyalkylene-group-containing polymer in the coating liquid for anchor layer is preferably from 0.005 to 5% by weight, more preferably from 0.01 to 3% by weight, even more preferably from 0.01 to 1% by weight, most preferably from 0.01 to 0.5% by weight.

Besides the mixed solvent and the polyoxyalkylene-group-containing polymer, a binder resin may be incorporated into the coating liquid for anchor layer in the present invention, if necessary. For improving the anchoring power of the pressure-sensitive adhesive, the binder component used may be, for example, a polyurethane resin based binder such as a water-soluble or water-dispersible polyurethane resin based binder, an epoxy resin based binder, an isocyanate resin based binder, a polyester resin based binder, a polymer having in the molecule thereof an amino group, a binder of an acrylic resin that may be of various types and contains, for example, an oxazoline group, or any other resin (polymer) having an organic reactive group. In order to improve the electroconductivity of the anchor layer, it is preferred to use a polythiophene based polymer. The content by percentage of the binder resin in the coating liquid for anchor layer is preferably from 0.005 to 5% by weight, more preferably from 0.01 to 3% by weight, even more preferably from 0.01 to 1% by weight, most preferably from 0.01 to 0.5% by weight.

In the case of using the polyurethane resin based binder, such as a water-soluble or water-dispersible polyurethane resin based binder, an improvement is made, particularly, in the adhesion between an optical film and an adhesive layer, therefore it is preferable.

An additive may be blended into the coating liquid for anchor layer if necessary. Examples of the additive include a leveling agent, an antifoaming agent, a thickener, and an antioxidant. Of these additives, preferred is a leveling agent (for example, one having an acetylene skeleton). About the proportion of the additive (s), the amount thereof is preferably from about 0.01 to 500 parts by weight, more preferably from 0.1 to 300 parts by weight, even more preferably from 1 to 100 parts by weight for 100 parts by weight of the binder resin (solid content).

In the method according to the present invention for producing a pressure-sensitive adhesive layer-carrying optical film, the coating liquid for anchor layer is applied over an optical film so as to give an applied-coat thickness before drying of 20 μm or less. If this applied-coat thickness before drying is too large (the applying amount of the coating liquid for anchor layer is too large), the resultant coat is easily affected by the solvent so that the generation of a crack is promoted. Thus, the resultant pressure-sensitive adhesive layer-carrying optical film may be cracked. If the applied-coat thickness is too small, the adhesion between the optical film and the pressure-sensitive adhesive becomes insufficient so that the pressure-sensitive adhesive layer-carrying optical film may be deteriorated in endurance. Thus, the thickness is preferably from 2 to 17 μm, more preferably from 4 to 13 μm. The applied-coat thickness before drying can be calculated from the thickness of the anchor layer after drying and the proportion of the binder resin in the coating liquid for anchor layer. The method for applying the coating liquid for anchor layer is not particularly limited, and may be, for example, a coating, dipping, spraying method, or any other application method.

In the method according to the present invention for producing a pressure-sensitive adhesive layer-carrying optical film, drying is performed under conditions satisfying both of the following (1) and (2):

(1) the drying temperature T is from 40 to 70° C., and
(2) a value obtained by multiplying the drying temperature T (° C.) by the drying period H (seconds), T×H, satisfies:

$$400 \leq (T \times H) \leq 4000.$$

In this way, the mixed solvent is removed to form the anchor layer.

As the drying temperature T in the requirement (1) is made higher to dry the workpiece more rapidly, a solvent crack is more effectively prevented in the anchor-layer-formed side surface of the optical film. However, if the drying temperature T is too high, a deterioration of the optical film is promoted. Meanwhile, if the drying temperature T is too low, it is feared that the applied-coat external appearance of the anchor layer is deteriorated owing to insufficient drying, or a solvent crack is generated. It is therefore important that the drying temperature T is from 40 to 70° C. The temperature is preferably from 45 to 60° C.

If the value (T×H) obtained by multiplying the drying temperature T (° C.) by the drying period H (seconds) in the requirement (2) is too large, a deterioration of the optical film is unfavorably promoted. If the value is too small, it is feared that the applied-coat external appearance of the anchor layer is deteriorated owing to insufficient drying, or a solvent crack is generated. Thus, to satisfy $400 \leq (T \times H) \leq 4000$ is important. To satisfy $500 \leq (T \times H) \leq 2900$ is preferred, to satisfy $500 \leq (T \times H) \leq 2000$ is more preferred, and to satisfy $600 \leq (T \times H) \leq 1250$ is particularly preferred.

If the drying period H is too long, a deterioration of the optical film is unfavorably promoted. If the period is too short, it is feared that the applied-coat external appearance of the anchor layer is deteriorated owing to insufficient drying, or a solvent crack is generated. Thus, the drying period H is preferably from 5 to 100 seconds, more preferably 5 to 70 seconds, even more preferably from 10 to 35 seconds.

In the method according to the present invention for producing a pressure-sensitive adhesive layer-carrying optical film, in the case of lengthening the period from a time when the coating liquid for anchor layer is applied over the optical film to a time when drying is started under the above-mentioned drying conditions, the applied-coat external appearance of the anchor layer may be deteriorated and further the generation of a solvent crack may be promoted in the anchor-layer-formed side surface of the optical film. Unclear is why in this case of lengthening the period the solvent crack is promoted. The reason is however presumed that the mixed solvent in the coating liquid for anchor layer penetrates and diffuses into the polymer constituting the optical film. It is therefore more preferred that this period is shorter. Specifically, the period is 30 seconds or shorter, more preferably 20 seconds or shorter, in particular preferably 10 seconds or shorter. The lower limit thereof is not particularly limited. However, when workability and others are considered, an example thereof is about 1 second.

The anchor layer thickness after drying (dry thickness) is preferably from 3 to 300 nm, more preferably from 5 to 180 nm, even more preferably from 11 to 90 nm. If the thickness is less than 3 nm, the anchor layer may not sufficiently gain an anchoring performance onto the optical film and the pressure-sensitive adhesive layer. If the thickness is more than 300 nm, the thickness of the anchor layer is too large so that a shortage in the strength thereof may cause cohesive failure in the anchor layer. Thus, the anchor layer may not gain a sufficient anchoring performance.

Generally, when an anchor-layer-formed side surface of an optical film is made of a norbornene resin or a (meth) acrylic resin, particularly, a norbornene resin, applying a coating liquid for anchor layer onto the surface easily causes a solvent crack in a reliability test at a high temperature (95° C. or higher). Causes therefor are as follows: (1) the glass transition temperature (Tg) of the optical film becomes close to the test temperature, so that the optical film turns brittle; and (2) the shrinkage stress of the optical film becomes larger. Thus, for an article to be mounted onto an automobile and the like that are required to undergo a reliability test at a high temperature (95° C. or higher), it is necessary to render, particularly, the conditions for drying the coating liquid for anchor layer in the anchor-layer-forming step minutely-set conditions. However, when the method for producing a pressure-sensitive adhesive layer-carrying optical film according to the present invention is applied, a pressure-sensitive adhesive layer-carrying optical film excellent in crack resistance can be effectively produced even when the anchor-layer-formed side surface of its optical film is made of a norbornene resin or (meth)acrylic resin.

The method for producing a pressure-sensitive adhesive layer-carrying optical film according to the present invention may has, before the step of forming the anchor layer, the step of subjecting the anchor-layer-formed-side surface of the optical film to corona treatment or plasma treatment. By the corona treatment or plasma treatment, the adhesion between the optical film and the pressure-sensitive adhesive layer can be further enhanced.

After the formation of the anchor layer over the optical film, a pressure-sensitive adhesive layer is formed over the anchor layer. In this way, a pressure-sensitive adhesive layer-carrying optical film can be produced. The method for laminating the pressure-sensitive adhesive layer is not particularly limited. Examples thereof include a method of applying a pressure-sensitive adhesive solution over the anchor layer and then drying the workpiece, and a method of using a release sheet in which a pressure-sensitive adhesive layer is provided to transfer the anchor layer. The applying method employed may be, for example, a roll coating method such as reverse coating or gravure coating, or a spin coating method, screen coating method, fountain coating method, dipping method or spraying method. The thickness of the pressure-sensitive adhesive layer is preferably from 2 to 150 μm, more preferably from 2 to 100 μm, in particular preferably from 5 to 50 μm. If the thickness of the pressure-sensitive adhesive layer is too small, there are easily caused inconveniences, such as an insufficient adhesion with the anchor layer, and a peel thereof from a glass interface. If the thickness is too large, foaming of the pressure-sensitive adhesive, or other inconveniences may easily be caused.

Examples of the constituting member of the release sheet may be include any appropriate thin-leaf-like body, such as a paper, a film made of a synthetic resin such as polyethylene, polypropylene or polyethylene terephthalate, a rubber sheet, a cloth, a nonwoven cloth, a net, a foamed sheet, or a metal foil, and a laminate body thereof. If necessary, a surface of the release sheet may be subjected to a peeling treatment for giving a low tackiness thereto, such as silicone treatment, long-chain-alkyl treatment or a fluorine treatment, to improve peelability from the pressure-sensitive adhesive layer.

Each of the optical film, the pressure-sensitive adhesive layer and the like of the pressure-sensitive adhesive layer-carrying optical film of the present invention may be given an ultraviolet absorbing power, for example, in the manner of treating with an ultraviolet absorbent such as a salicylic acid ester compound, a benzophenol compound, a benzotriazole compound, a cyanoacrylate compound or a nickel complex compound.

The optical film used in the pressure-sensitive adhesive layer-carrying optical film of the present invention may be, for example, a polarizing film. A polarizing film having a transparent protective film on one or both surfaces of its polarizer is usually used.

The polarizer used is not particularly limited, and may be of various types. The polarizer is, for example, a polarizer obtained by adsorbing a dichroic substance such as iodine or a dichroic dye onto a hydrophilic polymer film, such as a polyvinyl alcohol film, a partially formalated polyvinyl alcohol film or an ethylene/vinyl acetate copolymer partially saponified film, and then drawing the film monoaxially, or a polyene-aligned film made of, for example, a polyvinyl-alcohol dehydrated product or a polyvinyl-chloride dehydrochloride-treated product. Of such films, preferred is a polarizer composed of a polyvinyl alcohol film and a dichroic substance such as iodine. The thickness of such a polarizer is not particularly limited, and is generally from about 3 to about 80 μm.

A polarizer obtained by dyeing a polyvinyl alcohol film with iodine and then drawing the film monoaxially may be formed, for example, by immersing a polyvinyl alcohol film in an aqueous solution of iodine so as to be dyed, and then drawing the film into a length 3 to 7 times the original length. If necessary, the film may be immersed in an aqueous solution of potassium iodide that may contain, for example, boric acid, zinc sulfate, or zinc chloride if necessary. Further, before dyeing, the polyvinyl alcohol film may be immersed in water to be washed as needed. Washing the polyvinyl alcohol film with water makes it possible to clean off stains or a blocking inhibitor on surfaces of the polyvinyl alcohol film, and further causes the polyvinyl alcohol film to be swelled, thus producing an advantageous effect of preventing an unevenness in the dyed color or the like. The drawing may be performed after, while or before dyeing with iodine. The drawing may be performed in an aqueous solution of boric acid, potassium iodide or the like, or in a water bath.

As a material constituting the transparent protective film, for example, a thermoplastic resin excellent in transparency, mechanical strength, thermal stability, water blocking performance, isotropy, and the like may be used. Specific examples of the thermoplastic resin include cellulose resins such as triacetylcellulose, polyester resin, polyethersulfone resin, polysulfone resin, polycarbonate resin, polyamide resin, polyimide resin, polyolefin resin, (meth)acrylate resin, cyclic polyolefin resin (norbornene based resin), polyarylate resin, polystyrene resin and polyvinyl alcohol resin; and mixtures thereof. The transparent protective film is bonded to one side surface of the polarizer through an adhesive layer, while as a transparent protective film on the other surface, a thermosetting resin or ultraviolet curable resin of, for example, an acrylic, urethane, acrylurethane, epoxy or silicone type may be used. The transparent protective film may contain any one or more additives. Examples of the additives include an ultraviolet absorbent, an antioxidant, a lubricant, a plasticizer, a release agent, a coloring inhibitor, a flame retardant, a nucleating agent, an antistatic agent, a pigment, and a colorant. The content by percentage of the thermoplastic resin in the transparent protective film is preferably from 50 to 100% by weight, more preferably from 50 to 99% by weight, even more preferably from 60 to 98% by weight, in particular preferably from 70 to 97% by weight. If the content by percentage of the thermoplastic resin in the transparent protective film is 50% by weight or less, it is feared that a high transparency and the like which a thermoplastic resin originally has cannot be sufficiently exhibited.

The transparent protective film may be a polymer film described in JP-A-2001-343529 (WO 01/37007), which may be made of, for example, a resin composition containing (A) a thermoplastic resin having, at its side chain, a substituted and/unsubstituted imide group, and (B) a thermoplastic resin having, at its side chain, a substituted and/or unsubstituted phenyl group and a nitrile group. A specific example thereof is a film made of a resin composition containing an alternate copolymer made from isobutylene and N-methylmaleimide, and acrylonitrile/styrene copolymer. The film used may be a film that is made from, for example, an extruded mixed product of the resin composition. Such a film is small in retardation and optical elastic coefficient to make it possible to overcome an unevenness and other inconveniences based on a strain of the polarizing film. The film is also small in moisture permeability to be excellent in humidification endurance.

The thickness of the transparent protective film may be appropriately decided, and is generally from about 1 to about 500 μm from the viewpoint of, for example, the strength, the handleability and other workabilities, and the thin layer property of the film. The thickness is preferably from 1 to 300 μm, more preferably from 5 to 200 μm, in particular suitably from 5 to 150 μm.

When transparent protective films are provided on both the sides of the polarizer, respectively, the protective film made of the same polymer material or made of different polymer materials or the like may be used at each of two sides.

For the transparent protective film of the present invention, it is preferred to use at least one selected from cellulose resin, polycarbonate resin, cyclic polyolefin resin and (meth) acrylic resin.

The cellulose resin is an ester made from cellulose and a fatty acid. Specific examples of the cellulose ester include triacetylcellulose, diacetylcellulose, tripropionylcellolose, and dipropionylcellulose. Of these celluloses, triacetylcellulose is particularly preferred. Triacetylcellulose is commercially available as many products, and is favorable from the viewpoint of easy availability and costs. Examples of a commercially available product of triacetylcellulose include trade name: "UV-50", "UV-80", "SH-80", "TD-80U", "TD- TAC" and "UZ-TAC", manufactured by Fuji Film Corp.; and "KC Series", manufactured by Konica Minolta Holdings Inc. About these triacetylcelluloses, generally, the in-plane retardation (Re) is substantially zero while the thickness-direction retardation (Rth) is about 60 nm.

A cellulose resin film small in thickness-direction retardation can be obtained, for example, by treating the cellulose resin as described above. Examples of a method therefor include a method of bonding, to a common cellulose film, a base film on which a solvent such as cyclopentanone or methyl ethyl ketone is applied, the base film being made of, for example, polyethylene terephthalate, polypropylene or stainless steel, heating/drying the workpiece (for example, at 80 to 150° C. for about 3 to 10 minutes), and then peeling the base film; and a method of applying, onto a common cellulose resin film, a solution in which norbornene resin, (meth)acrylic resin or the like is dissolved in a solvent such as cyclopentanone or methyl ethyl ketone, heating/drying the workpiece (for example, at 80 to 150° C. for about 3 to 10 minutes); and then peeling the applied film.

As the cellulose resin film small in thickness-direction retardation, a fatty acid substituted cellulose resin film having a controlled fatty acid substitution degree may be used. Commonly used triacetylcellulose has an acetic acid substitution degree of about 2.8. Preferably, by controlling the acetic acid substitution degree to 1.8 to 2.7, the Rth can be reduced. By adding, to the fatty acid substituted cellulose resin, a plasticizer such as dibutyl phthalate, p-toluenesulfonanilide or acetyltriethyl citrate, the Rth can be controlled into a small value. The addition amount of the plasticizer is preferably 40 parts by weight or less, more preferably from 1 to 20 parts by weight, more preferably from 1 to 15 parts by weight for 100 parts by weight of the fatty acid substituted cellulose resin.

A specific example of the cyclic polyolefin resin is preferably norbornene resin. The cyclic polyolefin resin is a generic name of any resin obtained by polymerizing a cyclic olefin as a polymer unit. Examples thereof include resins described JP-A-1-240517, JP-A-3-14882, and JP-A-3-122137. Specific examples thereof include a ring-opened (co) polymer made from a cyclic olefin, an addition polymer made from a cyclic olefin, and a copolymer (typically, a random copolymer) made from a cyclic olefin and an α-olefin such as ethylene or propylene; graft polymers obtained by modifying these polymers, respectively, with an unsaturated carboxylic acid or a derivative thereof; and hydrogenated products thereof. A specific example of the cyclic olefin is a norbornene based monomer.

The cyclic polyolefin resin is commercially available as various products. Specific examples thereof include "ZEONEX" and "ZEONOR", manufactured by Zeon Corp., "ARTON" manufactured by JSR Corp., "TOPAS" manufactured by Ticona Co., and "APEL" manufactured by Mitsui Chemicals, Inc.

About the (meth)acrylic resin, the Tg (glass transition temperature) thereof is preferably 115° C. or higher, more preferably 120° C. or higher, even more preferably 125° C. or higher, in particular preferably 130° C. or higher. When the Tg is 115° C. or higher, the polarizing film can be excellent in endurance. The upper limit of the Tg of the (meth)acrylic resin is not particularly limited, but is preferably 170° C. or lower from the viewpoint of the shapability of the resin. By using of the (meth)acrylic resin, a film can be obtained which has an in-plane retardation (Re) of substantially zero and a thickness-direction retardation (Rth) of the same.

As the (meth)acrylic resin, any (meth)acrylic resin may be adopted as far as the advantageous effects of the present invention are not damaged. Examples thereof include poly (meth)acrylates such as polymethyl methacrylate, methyl methacrylate/(meth)acrylic acid copolymer, methyl methacrylate/(meth)acrylate copolymer, methyl methacrylate/(meth)acrylate/(meth)acrylic acid copolymer, and methyl (meth)acrylate/styrene copolymer (such as MS resin); and polymers each having an alicyclic hydrocarbon group (such as methyl methacrylate/cyclohexyl methacrylate copolymer, methyl methacrylate/norbornyl (meth)acrylate copolymer). Preferably, poly(a C1-C6 alkyl (meth)acrylate) such as polymethyl (meth)acrylate may be mentioned. The resin is more preferably methyl methacrylate resin containing methyl methacrylate (in a proportion of 50 to 100% by weight, more preferably from 70 to 100% by weight) as a main component.

Specific examples of the (meth)acrylic resin include ACRYPET VH and ACRYPET VRL20A, manufactured by Mitsubishi Rayon Co., Ltd.; and (meth)acrylic resins each having in the molecule thereof a cyclic structure, and high-Tg (meth)acrylic resins each obtained by intramolecular crosslinking or intramolecular cyclization reaction, each described in JP-A-2004-70296.

The (meth)acrylic resin used may be a (meth)acrylic resin having a lactone ring structure since the resin is high in heat resistance and transparency, and gains a high mechanical strength when biaxially drawn.

Examples of the (meth)acrylic resin having a lactone ring structure include (meth)acrylic resins described in JP-A-2000-230016, JP-A-2001-151814, JP-A-2002-120326, JP-A-2002-254544, and JP-A-2005-146084, each having a lactone ring structure.

The (meth)acrylic resin having a lactone ring structure preferably has a ring-like structure represented by the following general formula (1):

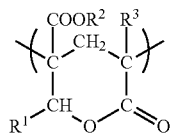

[Formula 1]

wherein $R^1$, $R^2$ and $R^3$ each independently represent a hydrogen atom or an organic residue having 1 to 20 carbon atoms. The organic residue may have an oxygen atom.

The content by percentage of a lactone ring structure represented by the general formula (1) in the (meth)acrylic resin structure having a lactone ring structure is preferably from 5 to 90% by weight, more preferably from 10 to 70% by weight, even more preferably from 10 to 60% by weight, in particular preferably from 10 to 50% by weight. If this content by percentage is less than 5% by weight, there is a fear that the resin may be insufficient in heat resistance, solvent resistance, and surface hardness. If the content by percentage is more than 90% by weight, there is a fear that the resin may be poor in shaping-processability.

About the (meth)acrylic resin having a lactone ring structure, the mass-average molecular weight, which may be referred to as the weight-average molecular weight, is preferably from 1000 to 2000000, more preferably from 5000 to 1000000, even more preferably from 10000 to 500000, in particular preferably from 50000 to 500000. If the mass-average molecular weight is out of the range, the resin is not preferred from the viewpoint of the shaping-processability.

About the (meth)acrylic resin having a lactone ring structure, the Tg thereof is preferably 115° C. or higher, more preferably 120° C. or higher, even more preferably 125° C. or higher, in particular preferably 130° C. or higher. For example, when the resin is integrated, in the form of a transparent protective film, into a polarizing film, the polarizing film is excellent in endurance since the Tg is 115° C. or higher. The upper limit of the Tg of the (meth)acrylic resin having a lactone ring structure is not particularly limited, but is preferably 170° C. or lower from the viewpoint of the shaping-workability and others.

About the (meth)acrylic resin having a lactone ring structure, a more preferred result is obtained as the total light transmittance of a shaped product therefrom by injection molding is higher. The transmittance is measured in accordance with ASTM-D-1003. The total light transmittance is preferably 85% or more, more preferably 88% or more, even more preferably 90% or more. The total light transmittance is a reference for the transparency. If the total light transmittance is less than 85%, there is a fear that the shaped product may be declined in transparency.

As the transparent protective film, usually, a film is used which has an in-plane retardation of less than 40 nm, and a thickness-direction retardation of less than 80 nm. The in-plane retardation Re is represented by Re=(nx−ny)×d. The thickness-direction retardation Rth is represented by Rth=(nx−nz)×d. The Nz coefficient is represented by Nz=(nx−nz)/(nx−ny). In these equations, nx, ny and nx represent the refractive index in the slow axis direction, that in the fast axis direction, and that in the thickness direction of the film, respectively, and d (nm) represents the thickness of the film. The slow axis direction is defined as the direction in the in-plane of the film in which the refractive index is the largest. It is preferred that the transparent protective film is colored as little as possible. It is preferred to use a protective film having a retardation value of −90 nm to +75 nm in the thickness direction. Using this film, the retardation value (Rth) of which is from −90 to +75 nm in the thickness direction, makes it possible to overcome substantially completely a coloration (optical coloration) of the polarizing film caused by the transparent protective film. The retardation value in the thickness direction (Tth) is more preferably from −80 nm to +60 nm, in particular preferably from −70 nm to +45 nm.

Meanwhile, the transparent protective film used may be a retardation plate having an in-plane retardation of 40 nm or more and/or a thickness-direction retardation of 80 nm or more. The in-plane retardation and the thickness-direction retardation are usually controlled into the range of 40 to 200 nm and that of 80 to 300 nm, respectively. When a retardation plate is used as a transparent protective film, the whole can be made thin since this retardation plate functions also as a transparent protective film.

Examples of the retardation plate include a birefringence film obtained by drawing a polymer material monoaxially or biaxially, an alignment film made of a liquid crystal polymer, and a product in which an alignment layer made of a liquid crystal polymer is supported on a film. The thickness of the retardation plate is not particularly limited, and is generally from about 20 to about 150 μm.

Examples of the polymer material include polyvinyl alcohol, polyvinyl butyral, polymethyl vinyl ether, polyhydroxyethyl acrylate, hydroxyethylcellulose, hydroxypropylcellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resin, and cyclic polyolefin resin (norbornene resin); and binary, ternary and other various copolymers, graft copolymers, and blends of two or more of these polymers. These polymer materials may be made into aligned products (drawn films) by drawing, or some other processing.

The liquid crystal polymer may be of various types, such as a main chain type and a side chain type in which a conjugated linear atomic group (mesogen) for giving a liquid alignment is introduced into a main chain and a side chain of a polymer, respectively. Specific examples of the main chain type liquid crystal polymer include a nematic alignment polyester liquid crystal polymer, a discotic polymer and a cholesteric polymer each having a structure in which a mesogen group is bonded via a spacer moiety for imparting flexibility. A specific example of the side chain type liquid crystal polymer is one having, as a main chain skeleton, polysiloxane, polyacrylate, polymethacrylate or polymalonate, and having, as a side chain, a mesogen moiety made of a para-substituted cyclic compound unit capable of giving nematic alignment via a spacer moiety made of a conjugated atomic group. These liquid crystal polymers are each obtained, for example, by developing a solution of the liquid crystal polymer onto an alignment treated surface of a product obtained by subjecting a surface of a thin film made of, for example, polyimide or polyvinyl alcohol, formed on a glass plate to rubbing treatment; or a product in which silicon oxide is obliquely evaporated onto the same surface; and then treating the workpiece thermally.

The retardation plate may be one having an appropriate retardation corresponding to a use purpose thereof, for example, one for compensating for coloration or a viewing angle change on the basis of the birefringence of various wavelength plates or the liquid crystal layer. The retardation plate may be a product in which two or more retardation plates are laminated onto each other so as to be controlled in retardation and other optical properties.

The retardation plate is selected from those satisfying relationships of nx=ny>nz, nx>ny>nz, nx>ny=nz, nx>nz>ny, nz=nx>ny, nz>nx>ny, and nz>nx=ny in accordance with a use purpose thereof that may be of various types, and then used. The relationship "ny=nz" denotes not only a case where ny is completely equal to nz but also a case where ny is substantially equal to nz.

In the case of, for example, a retardation plate satisfying "nx>ny>nz", it is preferred to use a retardation plate having an in-plane retardation of 40 to 100 nm, a thickness-direction retardation of 100 to 320 nm and an Nz coefficient of 1.8 to 4.5. In the case of, for example, a retardation plate satisfying "nx>ny=nz" (positive A plate), it is preferred to use a retardation plate having an in-plane retardation of 100 to 200 nm. In the case of, for example, a retardation plate satisfying "nz=nx>ny" (negative A plate), it is preferred to use a retardation plate having an in-plane retardation of 100 to 200 nm. In the case of, for example, a retardation plate satisfying "nx>nz>ny", it is preferred to use a retardation plate having an in-plane retardation of 150 to 300 nm and an Nz coefficient of more than 0, and 0.7 or less. As described above, a retardation plate satisfying nx=ny>nz, nz>nx>ny, or nz>nx=ny may be used.

The transparent protective film may be appropriately selected in accordance with a liquid crystal display device in which the film is used. In the case of, for example, a device in a VA (vertical alignment) mode, which may be an MVA or PVA mode, it is desired that a transparent protective film on at least one side (cell side) of its polarizing film has a retardation. Specifically, the retardation desirably satisfies the following: Re=0 to 240 nm, and Rth=0 to 500 nm. About the three dimensional refractive indexes thereof, it is desired to satisfy nx>ny=nz, nx>ny>nz, nx>nz>ny, or nx=ny>nz (a positive A plate, a biaxial film or a negative C plate). In the VA mode device, it is preferred to use a combination of a positive A plate with a negative C plate, or a biaxial film alone. In the case of using polarizing films over and under its liquid crystal cell, respectively, respective transparent protective films over and under the liquid crystal cell may each have a retardation, or either one of the protective films may have a retardation.

In the case of, for example, a device in an IPS (in-plane switching) mode, which may be an FFS mode, any polarizing film may be used wherein a transparent protective film on one side of the film may or may not have a retardation. For example, when the transparent protective film has no retardation, it is desired that transparent protective films, which include the protective film described just above, over and under the liquid crystal cell (cell side) each have no retardation. When the transparent protective film has a retardation, it is desired that transparent protective films over and under the liquid crystal cell each have a retardation, or either one of these films has a retardation (for example, a case where the upper transparent protective film is a biaxial film satisfying the relationship "nx>nz>ny" and the lower transparent protective film has no retardation, or a case where the upper transparent protective film is a positive A plate and the lower transparent protective film is a positive C plate). When the transparent protective film has a retardation, the retardation desirably satisfies the following: Re=−500 to 500 nm, and Rth=−500 to 500 nm. About the three dimensional refractive indexes thereof, it is desired to satisfy nx>ny=nz, nx>nz>ny, nz>nx=ny, or nz>nx>ny (a positive A plate, a biaxial film or a positive C plate).

When the above-mentioned film, which has a retardation, is bonded to a transparent protective film having no retardation, the above-mentioned function can be given thereto.

The above-mentioned transparent protective films may be subjected to surface-modifying treatment, before a pressure-sensitive adhesive is applied thereto, to improve the adhesion thereof onto a polarizer. Specific examples of the treatment include corona treatment, plasma treatment, flame treatment, ozone treatment, primer treatment, glow treatment, saponifying treatment, and treatment by a coupling agent. An antistatic layer may be appropriately formed thereon.

A hard coat layer or a treatment for reflection reduction, sticking prevention, diffusion or anti-glaring may be applied onto the surface of the transparent protective film to which no polarizer is bonded.

The hard coat layer is a layer for preventing a scratch in the front surface of the polarizing film, and may be formed, for example, in a manner of applying, onto the front surface of the transparent protective film, a cured coat film that is made of an appropriate ultraviolet curable resin, such as an acrylic or silicone resin, and is excellent in hardness, slipping property and others. The reflection reduction treatment is conducted so as to reduce reflection of external light on the front surface of the polarizing film, and may be attained by forming a reflection reduction film according to a conventional method. The sticking prevention treatment may be conducted so as to prevent the transparent protective film from adhering closely to an adjacent layer (such as a diffusion plate on the back light side of a liquid crystal display device).

The anti-glaring treatment is conducted, for example, in order to prevent a matter that external light is reflected on the front surface of the polarizing film so that light transmitted through the polarizing film is hindered from being viewed. This treatment can be attained by imparting a structure of fine irregularities to the front surface of the transparent protective film in an appropriate manner, for example, a surface-roughening manner such as a sandblasting manner or an embossing manner, or a manner of blending transparent fine particles. Fine particles incorporated into the front-surface fine-irregularity-structure to form this structure may be, for example, transparent fine particles, such as inorganic fine particles that have an average particle diameter of 0.5 to 20 μm, made of, for example, silica, alumina, titania, zirconia, tin oxide, indium oxide, cadmium oxide or antimony oxide, and may have electroconductivity, or organic fine particles made of, for example, a crosslinked or uncrosslinked polymer. When the front-surface fine-irregularity-structure is formed, the amount of the fine particles used is generally from about 2 to about 70 parts by weight, preferably from 5 to 50 parts by weight for 100 parts by weight of a transparent resin that forms the front-surface fine-irregularity-structure. The antiglare layer may be a layer functioning also as a diffusion layer for enlarging the viewing angle and the like (for example, a viewing angle enlarging function) by causing light transmitted through the polarizing film to diffuse.

The above-mentioned reflection reduction layer, sticking prevention layer, diffusion layer and antiglare layer, and the like may be provided onto the transparent protective film itself, or may be provided as an optical layer in the form of a member separated from the transparent protective film.

For the treatment for bonding the polarizer and the transparent protective film onto each other, an adhesive is used. Examples of the adhesive include isocyanate adhesives, polyvinyl alcohol adhesives, gelatin adhesives, vinyl latex adhesives, and water-affinitive polyesters. The adhesive is usually used in the form of a solution of the agent in water, and usually contains 0.5 to 60% by weight of a solid content. Besides the above, examples of the adhesive for the polarizer and the transparent protective film include ultraviolet curable adhesives, and electron beam curable adhesives. The electron beam curable adhesives for a polarizing film show a tackiness suitable for the above-mentioned various transparent protective films. A metal compound filler may be incorporated into the adhesive used in the present invention.

The optical film may be an optical layer that may be used to form, for example, a liquid crystal display device. Examples thereof include reflectors, anti-transmission plates, retardation plates, which may be, for example, half and quarter wavelength plates, viewing angle compensation films, brightness enhancement films, and surface treatment films. These may be used alone as an optical film, or may be used in a form that one or more thereof are laminated onto the polarizing film when practically used.

A surface treatment film may be provided by being bonded onto a front plate. Examples of the surface treatment film include a hard coat film for imparting scratch resistance to a surface, an antiglare treatment film for preventing an undesired image from being protected onto an image display device, and reflection reduction films such as an antireflective film and a low reflective film. The front plate is provided by being bonded onto the front surface of an image display device, such as a liquid crystal display device, an organic EL display device, a CRT or a PDP, to protect the image display device, impart a high-class impression thereto, and discriminate the device from others by a design thereof. The front plate may be also used as a supporter for a λ/4 plate in a 3D-TV. For example, in a liquid crystal display device, a front plate is located over its polarizing film at the viewing-side of the device. When the pressure-sensitive adhesive layer in the present invention is used, a glass substrate as the front plate produces advantageous effects; besides, a plastic substrate, such as a polycarbonate substrate or a polymethyl methacrylate substrate, produces the same advantageous effects.

The optical film in which the above-mentioned optical layers are laminated on a polarizing film may be formed by a method of laminating the optical layers successively and individually in a process for producing, for example, a liquid crystal display device. However, the optical film obtained by laminating the optical layers beforehand is excellent in quality stability, fabricating workability and the like to produce an advantage of giving an improved liquid crystal display device and improving the productivity thereof. For laminating, an appropriate adhesive means, such as a pressure-sensitive adhesive layer, may be used. When the polarizing film is bonded to the optical layers, an optical axis of these members may be set to an appropriate layout angle in accordance with, for example, a target retardation property.

The pressure-sensitive adhesive layer-carrying optical film of the present invention may be preferably used for formation of various image display devices such as a liquid crystal display device, and the like. The liquid crystal display device may be formed according to the prior art. Specifically, a liquid crystal display device is generally formed, for example, by fabricating appropriately a display panel such as a liquid crystal cell, a pressure-sensitive adhesive layer-carrying optical film, an optional lighting system and other constituent members, and integrating a driving circuit into the workpiece; in the present invention, a liquid crystal display device is formed according to such a conventional method without especial limitation, except that the pressure-sensitive adhesive layer-carrying optical film according to the present invention is used. Its liquid crystal cell may be a cell in any mode, such as a TN, STN, π, VA, or IPS mode.

The present invention is used to make it possible to form an appropriate liquid crystal display device, such as a display device in which the pressure-sensitive adhesive-carrying optical film is arranged on one or both sides of a display panel such as a liquid crystal cell, or a display device in which a backlight or a reflector is used as a lighting system. In this case, the optical films according to the present invention may be provided at one or both sides of the display panel such as the liquid crystal cell. When the optical films are located at both the sides, the films may be the same or different. Further, when the liquid crystal display device is formed, appropriate members such as a diffusion plate, an antiglare layer, a reflection reduction film, a protective plate, a prism array, a lens array sheet, a light diffusion plate, and a backlight may be arranged at any appropriate positions as one layer or two layers or more.

The following will describe an organic electroluminescence device (organic EL display device: OLED). Generally, in an organic EL display device, a transparent electrode, an organic luminous layer and a metal electrode are successively laminated onto a transparent substrate to form a luminous body (organic electroluminescence body). The organic luminous layer is a laminate body composed of various organic thin films. As the structure of this layer, structures having a combination that may be of various types are known, for example, a laminate body composed of a hole injection layer made of, for example, a triphenylamine derivative, and a luminous layer made of a fluorescent organic solid such as anthracene, a laminate body composed of such a luminous layer and an electron injection layer made of, for example, a perylene derivative, or a laminate body composed of a hole injection layer, a luminous layer and an electron injection layer as described herein.

In an organic EL display device, by applying a voltage to its transparent electrode and its metal electrode across them, holes and electrons are injected into the organic luminous layer, and the holes and electrons are recombined to generate an energy. The energy excites the fluorescent substance. When the excited fluorescent substance is returned to a ground state thereof, light is radiated. By this principle, light is emitted. The mechanism of the recombination in the middle of this process is equivalent to that of ordinary diodes. As can be expected also from this matter, the electric current and the luminescence intensity show an intense non-linearity, with rectification, relative to an applied voltage.

In an organic EL display device, at least one of its electrodes needs to be transparent to take out luminescence from the organic luminous layer. Usually, its transparent electrode made of a transparent electroconductor such as indium tin oxide (ITO) is used as a positive electrode. In order to make the injection of electrons easy to raise the luminescence efficiency, it is important to use a substance small in working function for a negative electrode. Usually, an electrode made of a metal, such as Mg—Ag or Al—Li, is used.

In an organic EL display device having such a structure, its organic luminous layer is formed with a very thin film having a thickness of about 10 nm. Thus, like its transparent electrode, the organic luminous layer also transmits light substantially completely. As a result, when no light is emitted, light radiated into the device from a surface of its transparent substrate, transmitted through the transparent electrode and the organic luminous layer and then reflected on its metal electrode is again directed to the surface of the transparent substrate. Accordingly, when the organic EL display device is viewed from the outside, the display surface of the device looks a mirror plane.

In an organic-electroluminescent-body-containing organic EL display device having a transparent electrode on the front surface side of its organic luminous layer, which emits light when a voltage is applied to the device, and further having a metal electrode on the rear surface side of the organic luminous layer, a polarizing film may be provided on the front surface side of the transparent electrode and further a retardation plate may be interposed between the transparent electrode and the polarizing film.

Since the retardation plate and the polarizing film have an action of polarizing light radiated thereinto from the outside and then reflected on the metal electrode, these members have an effect that the mirror plane of the metal electrode is caused not to be viewed from the outside by the polarizing effect. In particular, in the case of rendering the retardation plate a quarter wavelength plate and adjusting the angle between the respective polarizing directions of the polarizing film and the retardation plate to π/4, the mirror plane of the metal electrode can be completely shielded.

In short, about external light radiated into this organic EL display device, only its linearly polarized light component is transmitted by effect of the polarizing film. This linearly polarized light ray is generally turned to an elliptically polarized light ray by the retardation plate. However, particularly, when the retardation plate is a quarter wavelength plate and further the angle between the respective polarizing directions of the polarizing film and the retardation plate is π/4, the light ray is turned to a circularly polarized light ray.

This circularly polarized light ray is transmitted through the transparent substrate, the transparent electrode, and the organic thin film, reflected on the metal electrode, and again transmitted through the organic thin film, the transparent electrode and the transparent substrate to be again turned to a linearly polarized light ray through the retardation plate. This linearly polarized light ray is perpendicular to the polarizing direction of the polarizing film so as not to be transmissible through the polarizing film. As a result, the mirror plane of the metal electrode can be completely shielded.

EXAMPLES

Hereinafter, the present invention will be specifically described by way of working examples. However, the present invention is not limited by these examples. In each of the examples, the word "part (s)" and the symbol "%" denote "part(s) by weight" and "% by weight", respectively.

Example 1

Formation of Optical Film (Polarizing Film):

A polyvinyl alcohol film having a thickness of 80 μm was drawn into a draw ratio of 3 between rolls which are different in velocity, while dyeing in an iodine solution at a concentration of 0.3% at 30° C. for 1 minute. Thereafter, while the film was immersed in a 60° C. aqueous solution containing boric acid at a concentration of 4% and potassium iodide at a concentration of 10% for 0.5 minutes, the film was drawn into a total draw ratio of 6. Next, the film was immersed in a 30° C. aqueous solution containing potassium iodide at a concentration of 1.5% for 10 seconds to be washed. Thereafter, the workpiece was dried at 50° C. for 4 minutes to yield a polarizer. A triacetylcellulose film having a thickness of 40 μm (trade name: "KC4UY", manufactured by Konica Minolta Holdings Inc.) was bonded to a viewing-side-surface of the polarizer through a polyvinyl alcohol adhesive, while a retardation plate made of a norbornene resin film having a thickness of 33 μm (trade name: "ZEONOR FILM ZD12", manufactured by Zeon Corp.) was bonded to the pressure-sensitive adhesive-applied-side surface as a transparent protective film to produce a polarizing film.

Preparation of Pressure-Sensitive Adhesive:

Into a reactor having a cooling tube, a nitrogen introducing tube, a thermometer and a stirrer were charged 94.9 parts of butyl acrylate, 5 parts of acrylic acid, 0.1 parts of 2-hydroxyethyl acrylate, and dibenzoyl peroxide (NYPER BMT40 (SV), manufactured by NOF Corp.), the amount of which was 0.3 part for 100 parts of the monomers (solid content), together with ethyl acetate. In a flow of nitrogen gas, they were allowed to react at 60° C. for 7 hours, and then ethyl acetate was added to the reaction liquid to yield a polymer solution A containing an acrylic polymer having a weight-average molecular weight of 2200000 (solid concentration: 30% by weight). Into the acrylic polymer were blended 0.6 part of trimethylolpropanetolylenediisocyanate (COLONATE L, manufactured by Nippon Polyurethane Industry Co., Ltd.), and 0.075 part of γ-glycidoxypropyl-methoxysilane (KBM-403, manufactured by Shin-Etsu Chemical Co., Ltd.), these amounts being each an amount for 100 parts of the solid content in the acrylic polymer solution. In this way, an acrylic pressure-sensitive adhesive solution was yielded.

Preparation of Coating liquid For Anchor Layer:

To a (mixed) solution containing 100% by weight of water, was added a solution containing an oxazoline-group-containing acrylic polymer, the percentage of any solid therein being from 10 to 70% by weight, and a polyoxyethylene-group-containing methacrylate, the percentage of any solid therein being from 10 to 70% by weight [trade name: EPOCROS WS-700, manufactured by Nippon Shokubai Co.]. The concentration of any solid (base concentration) in this solution was adjusted to 0.2% by weight. A Mayer bar #5 was used to paint the prepared solution onto the unsaponified TAC film side surface of the polarizing film. Before the workpiece was put into a drying oven, it was allowed to stand still for a period (period up to the start of drying) of 5 seconds. It was then dried at 50° C. for 25 seconds to form a coated anchor layer having a thickness of 25 nm. The applied-coat thickness before drying was about 12 μm, which was calculated from the dry thickness. The working was performed in an atmosphere having a temperature of 23° C. and a relative humidity of 55%. For reference, when a Mayer bar is used for applying, the applied-coat thickness before drying is substantially consistent with the clearance of the Mayer bar. Accordingly, a desired applied-coat thickness before drying can be adjusted to some degree by changing the wire number of the Mayer bar to be used. Table 1 shows the respective clearances of the respective wire numbers of individual Mayer bars.

TABLE 1

| The wire number of Mayer bar | Clearance [μm] |
|---|---|
| #1 | 2 |
| #2 | 5 |
| #5 | 12 |
| #7 | 17 |
| #8 | 20 |
| #11 | 28 |

Production of Pressure-sensitive Adhesive Layer-carrying Optical Film:

A fountain coater was used to apply the pressure-sensitive adhesive solution evenly onto a surface of a polyethylene terephthalate film (substrate) treated with a silicone release agent. The workpiece was dried in an air-circulating type thermostat oven at 155° C. for 2 minutes to form a pressure-sensitive adhesive layer having a thickness of 20 μm on the surface of the substrate. Next, the pressure-sensitive adhesive-layer-formed separator was shifted onto the anchor-layer-carrying optical film. In this way, a pressure-sensitive adhesive layer-carrying optical film was produced.

Examples 2 to 30, and Comparative Examples 1 to 9

In each of these examples, pressure-sensitive adhesive layer-carrying optical films were each produced in the same way as in Example 1 except that the following were changed as described in Table 2A and 2B: in the optical film (polarizing film), the kind of the transparent protective film on the anchor-layer-formed side surface; the base concentration; the applied-coat thickness before drying; the mixed solvent composition; the drying conditions; and/or the binder composition.

In Table 2A and 2B, the wording "Substrate" represents the transparent protective film on the anchor-layer-formed-side surface;

"Dry treatment": the kind of the treatment subjected to the anchor-layer-formed-side surface of the substrate;

"TAC": an optical film made of saponified triacetylcellulose (manufactured by Konica Minolta Holdings Inc.);

"Acryl": an optical film made of a lactone-modified acrylic resin,

"ZEONOR": an optical film made of a norbornene resin (manufactured by Zeon Corp.);

"ARTON": an optical film made of a norbornene resin (manufactured by JSR Corp.);

"IPA": isopropyl alcohol,

"DENATRON P-580M": a solution containing a urethane polymer, the proportion of any solid therein being from 30 to 90% by weight, and a polythiophene based polymer, the proportion of any solid therein being from 10 to 50% by weight (manufactured by Nagase ChemteX Corp., this solution containing no polyoxyalkylene-group-containing polymer), "DENATRON P-521C": a solution containing a urethane polymer, the proportion of any solid therein being from 30 to 90% by weight, and a polythiophene based polymer, the proportion of any solid therein being from 10 to 50% by weight (manufactured by Nagase ChemteX Corp., this solution containing no polyoxyalkylene-group-containing polymer), "Dry thickness (nm)": dry thickness (nm), and "Wet applied-coat thickness (nm)": applied-coat thickness before drying.

About the pressure-sensitive adhesive layer-carrying optical films obtained in the working examples and the comparative examples, evaluations were made as descried below. The evaluation results are shown in Table 2A and 2B.

Crack Endurance:

A laminator was used to bond, onto each of both the surfaces of a non-alkali glass plate of 0.7 mm thickness, any one of the pressure-sensitive adhesive layer-carrying polarizing films (420 mm long×320 mm wide) yielded in each of the working examples and the comparative examples, so as to have a crossed nicols relation. Next, this laminate was treated at 50° C. and 5 atm in an autoclave for 15 minutes to cause the laminated members to adhere closely onto each other completely. The resultant sample was each treated under 85° C., 95° C. conditions for 500 hours. As to whether or not cracks were generated, a visual check was then made in accordance with the following evaluating criterion:

⦿ : No crack,

◯: Slight fine cracks giving no effect on the viewability,

Δ: Fine cracks giving no effect on the viewability in some regions of the sample, and x: Problem for practical use because of the generation of large cracks or many fine cracks.

Applied-coat External Appearance of Anchor Layers:

In each of the working examples and the comparative examples, a visual inspection was made about the applied-coat external appearance of any one of the workpieces immediately after the coating liquid for anchor layer was applied and then dried under the predetermined drying conditions. An evaluation criterion therefor is as follows:

⦿ : Very good applied-coat external appearance without the generation of repellency, paint unevenness nor any cohesive substance, ◯: Good applied-coat external appearance with slight repellency or paint unevenness giving no effect on the viewability of the final product, Δ: Applied-coat external appearance with repellency or paint unevenness giving no effect on the viewability and x: Problem for practical use because of large repellency or paint unevenness, the generation of a cohesive substance, or some other drawback.

Anchor Layer Thickness Measurement:

In each of the working examples and the comparative examples, any one of the pressure-sensitive adhesive layer-carrying optical films on each of which only the anchor layer was provided was dyed with a 2% solution of ruthenate in water for 2 minutes, and then the resultant was buried into an epoxy resin. A super microtome (Ultracut S, manufactured by Leica) was used to cut the resultant into a thickness of about 80 nm. Next, a cross section of this slice of the optical film was observed through a transmission electron microscope (TEM) (H-7650, manufactured by Hitachi. Ltd., accelerating voltage: 100 kV) to measure the thickness of the anchor layer after drying (dry thickness (nm)).

Evaluation of Adhesion Between Substrate and Pressure-Sensitive Adhesive Layer (Reworkability):

A laminator was used to bond, onto a non-alkali glass plate of 0.7 mm thickness, anyone of the pressure-sensitive adhesive layer-carrying polarizing films (420 mm long×320 mm wide) yielded in each of the working examples and the comparative examples. Next, this laminate was treated at 50° C. and 5 atm in an autoclave for 15 minutes to cause the two members to adhere closely onto each other (at an initial stage). Thereafter, the resultant sample was peeled from the non-alkali glass plate by hand. The adhesion (reworkability) was evaluated in accordance with the following criterion:

⦿ : Satisfactory peelability with no adhesive residue,

◯: Satisfactory peelability with a slight adhesive residue,

Δ: Peelability with adhesive residues in some regions of the sample, and x: Adhesive residues in 1/2 regions or more of the glass surface of the sample.

TABLE 2A

| | | Adhesive | | Anchor layer forming conditions | | | | | | |
| | | Coupling agent/ | | Coating liquid for anchor layer composition | | | | | | |
| | Substrate | Polymer parts by solution weight | Dry treatment | Solvent | Solute 1 | Solute 2 | Base [%] | Solute 1 [%] | Solute 2 [%] | Compatibility |
| Example 1 | ZEONOR | A KBM403/ 0.075 | Plasma | Water/IPA = 65/35 | EPOCROS WS-700 | — | 0.2 | 0.2 | — | ⊙ |
| Example 2 | ZEONOR | A KBM403/ 0.075 | Plasma | Water/IPA = 65/35 | EPOCROS WS-700 | DENATRON P-580W | 0.4 | 0.18 | 0.22 | ⊙ |
| Example 3 | ZEONOR | A KBM403/ 0.075 | Plasma | Water/IPA = 80/20 | EPOCROS WS-700 | — | 0.2 | 0.2 | — | ⊙ |

TABLE 2A-continued

| | | | | | | | | | | | |
|---|---|---|---|---|---|---|---|---|---|---|---|
| Example 4 | ZEONOR | A | KBM403/0.075 | Plasma | Water/IPA = 80/20 | EPOCROS WS-700 | DENATRON P-580W | 0.4 | 0.18 | 0.22 | ⊙ |
| Example 5 | ZEONOR | A | KBM403/0.075 | Plasma | Water/IPA = 20/80 | EPOCROS WS-700 | — | 0.2 | 0.2 | — | ⊙ |
| Example 6 | ZEONOR | A | KBM403/0.075 | Plasma | Water/ethanol = 20/80 | EPOCROS WS-700 | — | 0.2 | 0.2 | — | ⊙ |
| Example 7 | ZEONOR | A | KBM403/0.075 | Plasma | Water = 100 | EPOCROS WS-700 | — | 0.2 | 0.2 | — | ⊙ |
| Example 8 | ZEONOR | A | KBM403/0.075 | Plasma | Water = 100 | EPOCROS WS-700 | DENATRON P-580W | 0.4 | 0.18 | 0.22 | ⊙ |
| Example 9 | ZEONOR | A | KBM403/0.075 | — | Water = 100 | EPOCROS WS-700 | — | 0.2 | 0.2 | — | ⊙ |
| Example 10 | Acryl | A | KBM403/0.075 | — | Water = 100 | EPOCROS WS-700 | — | 0.2 | 0.2 | — | ⊙ |
| Example 11 | ZEONOR | A | KBM403/0.075 | Plasma | Water = 100 | EPOCROS WS-700 | — | 0.2 | 0.2 | — | ⊙ |
| Example 12 | ZEONOR | A | KBM403/0.075 | Plasma | Water = 100 | EPOCROS WS-700 | — | 0.2 | 0.2 | — | ⊙ |
| Example 13 | ZEONOR | A | KBM403/0.075 | Plasma | Water = 100 | EPOCROS WS-700 | — | 0.2 | 0.2 | — | ⊙ |
| Example 14 | ZEONOR | A | KBM403/0.075 | Plasma | Water = 100 | EPOCROS WS-700 | — | 0.2 | 0.2 | — | ⊙ |
| Example 15 | ZEONOR | A | KBM403/0.075 | Plasma | Water = 100 | EPOCROS WS-700 | — | 0.2 | 0.2 | — | ⊙ |
| Example 16 | ZEONOR | A | KBM403/0.075 | Plasma | Water = 100 | EPOCROS WS-700 | — | 0.2 | 0.2 | — | ⊙ |
| Example 17 | ZEONOR | A | KBM403/0.075 | Plasma | Water = 100 | EPOCROS WS-700 | — | 0.2 | 0.2 | — | ⊙ |
| Example 18 | ZEONOR | A | KBM403/0.075 | Plasma | Water = 100 | EPOCROS WS-700 | — | 0.2 | 0.2 | — | ⊙ |
| Example 19 | ZEONOR | A | KBM403/0.075 | Plasma | Water = 100 | EPOCROS WS-700 | — | 0.2 | 0.2 | — | ⊙ |
| Example 20 | ZEONOR | A | KBM403/0.075 | Plasma | Water = 100 | EPOCROS WS-700 | — | 0.2 | 0.2 | — | ⊙ |
| Example 21 | ZEONOR | A | KBM403/0.075 | Plasma | Water = 100 | EPOCROS WS-700 | — | 0.2 | 0.2 | — | ⊙ |
| Example 22 | ZEONOR | A | KBM403/0.075 | Plasma | Water = 100 | EPOCROS WS-700 | — | 0.2 | 0.2 | — | ⊙ |
| Example 23 | ZEONOR | A | KBM403/0.075 | Plasma | Water = 100 | EPOCROS WS-700 | — | 0.2 | 0.2 | — | ⊙ |
| Example 24 | ZEONOR | A | KBM403/0.075 | Plasma | Water = 100 | EPOCROS WS-700 | — | 0.2 | 0.2 | — | ⊙ |
| Example 25 | ZEONOR | A | KBM403/0.075 | Corona | Water = 100 | EPOCROS WS-700 | — | 0.2 | 0.2 | — | ⊙ |
| Example 26 | ARTON | A | KBM403/0.075 | Plasma | Water = 100 | EPOCROS WS-700 | — | 0.2 | 0.2 | — | ⊙ |
| Example 27 | Acryl | A | KBM403/0.075 | Plasma | Water = 100 | EPOCROS WS-700 | — | 0.2 | 0.2 | — | ⊙ |
| Example 28 | TAC | A | KBM403/0.075 | Plasma | Water = 100 | EPOCROS WS-700 | — | 0.2 | 0.2 | — | ⊙ |
| Example 29 | ZEONOR | A | KBM403/1 | Plasma | Water = 100 | EPOCROS WS-700 | — | 0.2 | 0.2 | — | ⊙ |
| Example 30 | ZEONOR | A | KBM403/2 | Plasma | Water = 100 | EPOCROS WS-700 | — | 0.2 | 0.2 | — | ⊙ |

| | Anchor layer forming conditions Drying conditions | | | | | Paintability [external appearance] | Adhesion | Crack endurance | |
|---|---|---|---|---|---|---|---|---|---|
| | Wet applied-coat thickness [μm] | Drying temperature [° C.] | Drying period [s] | T × H | Period [s] up to drying-start | Dry thickness [nm] | | | 85° C. | 95° C. |
| Example 1 | 12 | 50 | 25 | 1250 | 5 | 25 | ⊙ | ⊙ | ⊙ | ⊙ |
| Example 2 | 12 | 50 | 25 | 1250 | 5 | 48 | ⊙ | ⊙ | ⊙ | ⊙ |
| Example 3 | 12 | 50 | 25 | 1250 | 5 | 25 | ⊙ | ⊙ | ⊙ | ⊙ |
| Example 4 | 12 | 50 | 25 | 1250 | 5 | 48 | ⊙ | ⊙ | ⊙ | ⊙ |
| Example 5 | 12 | 50 | 25 | 1250 | 5 | 25 | ⊙ | ⊙ | ⊙ | ○ |
| Example 6 | 12 | 50 | 25 | 1250 | 5 | 25 | ⊙ | ⊙ | ⊙ | ○ |
| Example 7 | 12 | 50 | 25 | 1250 | 5 | 25 | ○ | ⊙ | ⊙ | ⊙ |
| Example 8 | 12 | 50 | 25 | 1250 | 5 | 48 | ○ | ⊙ | ⊙ | ⊙ |
| Example 9 | 12 | 50 | 25 | 1250 | 5 | 25 | △ | ⊙ | ⊙ | ⊙ |
| Example 10 | 12 | 50 | 25 | 1250 | 5 | 25 | ○ | ⊙ | ⊙ | ⊙ |
| Example 11 | 5 | 50 | 25 | 1250 | 5 | 10 | ○ | ⊙ | ⊙ | ⊙ |
| Example 12 | 2 | 50 | 25 | 1250 | 5 | 5 | ○ | ○ | ⊙ | ⊙ |
| Example 13 | 17 | 50 | 25 | 1250 | 5 | 35 | ○ | ⊙ | ⊙ | ○ |
| Example 14 | 20 | 50 | 25 | 1250 | 5 | 40 | ○ | ○ | ○ | △ |
| Example 15 | 12 | 50 | 25 | 1250 | 10 | 25 | ○ | ⊙ | ⊙ | ○ |

TABLE 2A-continued

| | | | | | | | | | | |
|---|---|---|---|---|---|---|---|---|---|---|
| Example 16 | 12 | 50 | 25 | 1250 | 18 | 25 | ○ | ◉ | ◉ | ○ |
| Example 17 | 12 | 50 | 25 | 1250 | 60 | 25 | ○ | ◉ | ○ | Δ |
| Example 18 | 12 | 50 | 80 | 4000 | 5 | 25 | ○ | ◉ | ○ | Δ |
| Example 19 | 12 | 50 | 60 | 3000 | 5 | 25 | ○ | ◉ | ○ | ○ |
| Example 20 | 12 | 50 | 35 | 1750 | 5 | 25 | ○ | ◉ | ◉ | ○ |
| Example 21 | 12 | 50 | 10 | 500 | 5 | 25 | ○ | ○ | ○ | ○ |
| Example 22 | 12 | 40 | 10 | 400 | 5 | 25 | ○ | ○ | ○ | Δ |
| Example 23 | 12 | 70 | 50 | 3500 | 5 | 25 | ○ | ◉ | ○ | Δ |
| Example 24 | 12 | 40 | 100 | 4000 | 5 | 25 | ○ | ◉ | ○ | Δ |
| Example 25 | 12 | 50 | 25 | 1250 | 5 | 25 | ○ | ○ | ◉ | ◉ |
| Example 26 | 12 | 50 | 25 | 1250 | 5 | 25 | ○ | ◉ | ◉ | ◉ |
| Example 27 | 12 | 50 | 25 | 1250 | 5 | 25 | ○ | ◉ | ◉ | ◉ |
| Example 28 | 12 | 50 | 25 | 1250 | 5 | 25 | ○ | ◉ | ◉ | ◉ |
| Example 29 | 12 | 50 | 25 | 1250 | 5 | 25 | ○ | ◉ | ◉ | ○ |
| Example 30 | 12 | 50 | 25 | 1250 | 5 | 25 | ○ | ◉ | ◉ | Δ |

TABLE 2B

| | | Adhesive | | Anchor layer forming conditions Coating liquid for anchor layer composition | | | | | | |
|---|---|---|---|---|---|---|---|---|---|---|
| | | Coupling agent/ | | | | | | | | |
| | Substrate | Polymer solution | parts by weight | Dry treatment | Solvent | Solute 1 | Solute 2 | Base [%] | Solute 1 [%] | Solute 2 [%] | Compatibility |
| Comparative Example 1 | ZEONOR | A | KBM403/ 0.075 | Plasma | Water = 100 | DENATRON P-521C | — | 0.6 | 0.6 | — | ◉ |
| Comparative Example 2 | ZEONOR | A | KBM403/ 0.075 | Plasma | Water = 100 | DENATRON P-521C | — | 0.6 | 0.6 | — | ◉ |
| Comparative Example 3 | ZEONOR | A | KBM403/ 0.075 | Plasma | Water = 100 | EPOCROS WS-700 | — | 0.2 | 0.2 | — | ◉ |
| Comparative Example 4 | ZEONOR | A | KBM403/ 0.075 | Plasma | Water = 100 | EPOCROS WS-700 | — | 0.2 | 0.2 | — | ◉ |
| Comparative Example 5 | ZEONOR | A | KBM403/ 0.075 | Plasma | Water = 100 | EPOCROS WS-700 | — | 0.2 | 0.2 | — | ◉ |
| Comparative Example 6 | ZEONOR | A | KBM403/ 0.075 | Plasma | Water = 100 | EPOCROS WS-700 | — | 0.2 | 0.2 | — | ◉ |
| Comparative Example 7 | ZEONOR | A | KBM403/ 0.075 | Plasma | Water = 100 | EPOCROS WS-700 | — | 0.2 | 0.2 | — | ◉ |
| Comparative Example 8 | ZEONOR | A | KBM403/ 0.075 | Plasma | Water = 100 | EPOCROS WS-700 | — | 0.2 | 0.2 | — | ◉ |
| Comparative Example 9 | ZEONOR | A | KBM403/ 0.075 | Plasma | Water/ ethanol = 50/50 | EPOCROS WS-700 | — | 2 | 2 | — | ◉ |

| | Anchor layer forming conditions Drying conditions | | | | | | | | |
|---|---|---|---|---|---|---|---|---|---|
| | Wet applied-coat thickness [μm] | Drying temperature [°C.] | Drying period [s] | T × H | Period [s] up to drying-start | Dry thickness [nm] | Paintability [external appearance] | Adhesion | Crack endurance 85° C. | 95° C. |
| Comparative Example 1 | 12 | 50 | 25 | 1250 | 5 | 70 | X | X | ◉ | ◉ |
| Comparative Example 2 | 12 | 50 | 60 | 3000 | 5 | 70 | X | X | ◉ | ◉ |
| Comparative Example 3 | 28 | 50 | 25 | 1250 | 5 | 55 | ○ | ◉ | ○ | X |
| Comparative Example 4 | 12 | 23 | 25 | 575 | 5 | 25 | ○ | ○ | Δ | X |
| Comparative Example 5 | 12 | 23 | 60 | 1380 | 5 | 25 | ○ | ○ | Δ | X |
| Comparative Example 6 | 12 | 50 | 5 | 250 | 5 | 25 | ○ | ◉ | ○ | X |
| Comparative Example 7 | 12 | 50 | 135 | 6750 | 5 | 25 | ○ | ◉ | ○ | X |
| Comparative Example 8 | 12 | 70 | 100 | 7000 | 5 | 25 | ○ | ◉ | Δ | X |
| Comparative Example 9 | 9 | 40 | 120 | 4800 | 5 | 175 | ○ | ◉ | ○ | X |

What is claimed is:

1. A method for producing a pressure-sensitive adhesive layer-carrying optical film comprising an optical film, and a pressure-sensitive adhesive layer laminated over at least one surface of the optical film with an anchor layer interposed between the optical film and the adhesive layer, comprising the step of applying, over the optical film, a coating liquid for anchor layer comprising a mixed solvent comprising 10 to 100% by weight of water and 90 to 0% by weight of an alcohol, and a polyoxyalkylene-group-containing polymer so as to give an applied-coat thickness before drying of 20 μm or less; and next drying the workpiece under drying conditions satisfying both of the following requirements (1) and (2):

(1) the drying temperature T is from 40 to 70° C., and
(2) a value obtained by multiplying the drying temperature T (° C.) by the drying period H (seconds), T×H, satisfies:

400 ≤(T×H)≤4000, thereby removing the mixed solvent to form the anchor layer, wherein the period from the time of applying of the coating liquid for anchor layer over the optical film to the time when drying is started is 30 seconds or less, and an ammonia content in the coating liquid for anchor layer is less than 0.03 parts by weight for 100 parts by weight of a solid content, and wherein the pressure-sensitive adhesive layer is a solvent based adhesive layer.

2. The method for producing the pressure-sensitive adhesive layer-carrying optical film according to claim 1, wherein the alcohol is isopropyl alcohol and/or ethanol.

3. The method for producing the pressure-sensitive adhesive layer-carrying optical film according to claim 1, wherein the anchor-layer-formed-side surface of the optical film comprises a norbornene resin or (meth)acrylic resin.

4. The method for producing the pressure-sensitive adhesive layer-carrying optical film according to claim 1, comprising, before the step of forming the anchor layer, a step of subjecting the anchor-layer-formed-side surface of the optical film to corona treatment or plasma treatment.

5. The method for producing the pressure-sensitive adhesive layer-carrying optical film according to claim 1, wherein the pressure-sensitive adhesive layer-carrying optical film is a pressure-sensitive adhesive layer-carrying polarizing film.

6. The method for producing the pressure-sensitive adhesive layer-carrying optical film according to claim 1, wherein the mixed solvent comprises 65 to 100% by weight water and 35 to 0% by weight of an alcohol.

7. The method for producing the pressure-sensitive adhesive layer-carrying optical film according to claim 1, wherein a solvent of the solvent based adhesive layer is ethyl acetate or toluene.

* * * * *